United States Patent
Brown et al.

(10) Patent No.: US 10,941,811 B1
(45) Date of Patent: Mar. 9, 2021

(54) HIGH-SPEED BEARING

(71) Applicant: SCHAEFFLER TECHNOLOGIES AG & CO. KG, Herzogenaurach (DE)

(72) Inventors: James Brown, Rock Hill, SC (US); Alicia Vidal Ortiz, Puebla (MX)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/742,334

(22) Filed: Jan. 14, 2020

(51) Int. Cl.
*F16C 19/30* (2006.01)
*F16C 33/46* (2006.01)
*F16C 33/54* (2006.01)
*F16C 19/46* (2006.01)

(52) U.S. Cl.
CPC .......... *F16C 33/467* (2013.01); *F16C 19/305* (2013.01); *F16C 19/463* (2013.01); *F16C 33/4682* (2013.01); *F16C 33/541* (2013.01); *F16C 33/546* (2013.01)

(58) Field of Classification Search
CPC .... F16C 19/305; F16C 19/463; F16C 33/541; F16C 33/543; F16C 33/546; F16C 33/547; F16C 33/467; F16C 33/4682
USPC ........ 384/560, 564, 572, 618, 621, 623, 565
See application file for complete search history.

(56) References Cited

U.S. PATENT DOCUMENTS

| | | | | |
|---|---|---|---|---|
| 7,736,066 B2* | 6/2010 | Liu | ....................... | F16C 33/546 384/623 |
| 7,866,895 B2* | 1/2011 | Hayashi | ................ | B21D 53/12 384/572 |
| 7,878,715 B2* | 2/2011 | Kotani | ..................... | F16C 19/30 384/623 |
| 7,963,703 B2* | 6/2011 | Takamizawa | ....... | F16C 33/4605 384/618 |
| 8,926,191 B2* | 1/2015 | Fugel | .................... | F16C 19/305 384/623 |
| 9,593,714 B1* | 3/2017 | Ince | ........................ | F16C 33/543 |
| 2011/0229067 A1* | 9/2011 | Brown | ................ | F16C 33/4682 384/572 |
| 2011/0274385 A1 | 11/2011 | Nelson | | |

(Continued)

FOREIGN PATENT DOCUMENTS

| | | | | |
|---|---|---|---|---|
| JP | 2006242199 A | * | 9/2006 | ............ F16C 33/547 |
| JP | 2008286232 A | * | 11/2008 | .......... F16C 33/4635 |

(Continued)

*Primary Examiner* — Marcus Charles
(74) *Attorney, Agent, or Firm* — Brooks Kushman P.C.

(57) ABSTRACT

A roller bearing includes a first race, a second race, and a cage disposed between the first and second races. The cage has an inner rim and a plurality of webs extending radially outboard from the inner rim and being circumferentially arranged around the inner rim to be spaced apart to define pockets. The webs have flanges that extend axially. Portions of the inner rim form inner guide surfaces of the pockets. The cage further includes a wavy outer rim circumscribing the inner rim. The outer rim has radially outer portions attached to the flanges and radially inner portions forming outer guide surfaces of the pockets. The outer rim and the flanges cooperate to define cutouts interleaved with the webs. Cylindrical roller elements are disposed in the pockets between the first and second races and have first ends adjacent the inner guide surfaces and second ends adjacent the outer guide surfaces.

20 Claims, 4 Drawing Sheets

(56) References Cited

U.S. PATENT DOCUMENTS

2012/0163748 A1\* 6/2012 Henneberger ...... F16C 33/4605
   384/564
2015/0219158 A1\* 8/2015 Fugel ................... F16C 33/541
   384/623

FOREIGN PATENT DOCUMENTS

JP       4790253 B2 \* 10/2011 ............ F16C 33/467
JP    2012031904 A  \*  2/2012 ............ F16C 33/467

\* cited by examiner

HIGH-SPEED BEARING

TECHNICAL FIELD

The present disclosure relates to roller bearings having an axial cage designed for high-speed applications.

BACKGROUND

A bearing is one type of friction-reducing component. Many different types of bearings are used in a variety of applications. Roller bearings are one type of bearing that are commonly used in automotive applications. A typical roller bearing includes a first race, a second race, and a plurality of roller elements disposed between the first and second races. The roller elements may be spherical (commonly called ball bearings) or cylindrical (sometimes called needle bearings). The roller elements act between the races to provide smooth, low friction rotation. A cage is sometimes used to hold the roller elements in place to prevent contact and maintain spacing. The cage is disposed in the space defined between the races.

SUMMARY

According to one embodiment, a roller bearing includes a first race, a second race, and a cage disposed between the first and second races. The cage has an inner rim and a plurality of webs extending radially outboard from the inner rim and being circumferentially arranged around the inner rim to be spaced apart to define pockets. The webs have flanges that extend axially. Portions of the inner rim that are disposed between the webs form inner guide surfaces of the pockets. The cage further includes a wavy outer rim circumscribing the inner rim. The outer rim has radially outer portions attached to the flanges and radially inner portions forming outer guide surfaces of the pockets. The outer rim and the flanges cooperate to define cutouts interleaved with the webs. Cylindrical roller elements are disposed in the pockets between the first and second races and have first ends adjacent the inner guide surfaces and second ends adjacent the outer guide surfaces.

According to another embodiment, a cage for use with a roller bearing includes an inner rim and a plurality of webs extending radially outboard from the inner rim and being circumferentially arranged around the inner rim to be spaced apart to define pockets configured to receive roller elements. The webs have flanges that extend axially. Portions of the inner rim disposed between the webs forms inner guide surfaces of the pockets. A wavy outer rim circumscribes the inner rim. The outer rim has radially outer portions attached to the flanges and radially inner portions forming outer guide surfaces of the pockets. The outer rim and the flanges cooperate to define cutouts interleaved with the webs.

According to yet another embodiment, a roller bearing includes a first race, a second race, and a cage disposed between the first and second races. The cage includes an inner rim, a plurality of radially extending webs circumferentially arranged around the inner rim and spaced apart to define pockets, and an outer rim circumscribing the inner rim and connected to the webs. The outer rim defines a plurality of cutouts aligned with the pockets and disposed between the webs. Cylindrical roller elements are disposed in the pockets between the first and second races and have first ends adjacent the inner rim and second ends adjacent the outer rim. The roller elements are disposed in the pockets such that the cutouts expose the second ends to prevent contact between a perimeter portion of the roller elements and the outer rim.

DETAILED DESCRIPTION

Figure 1:
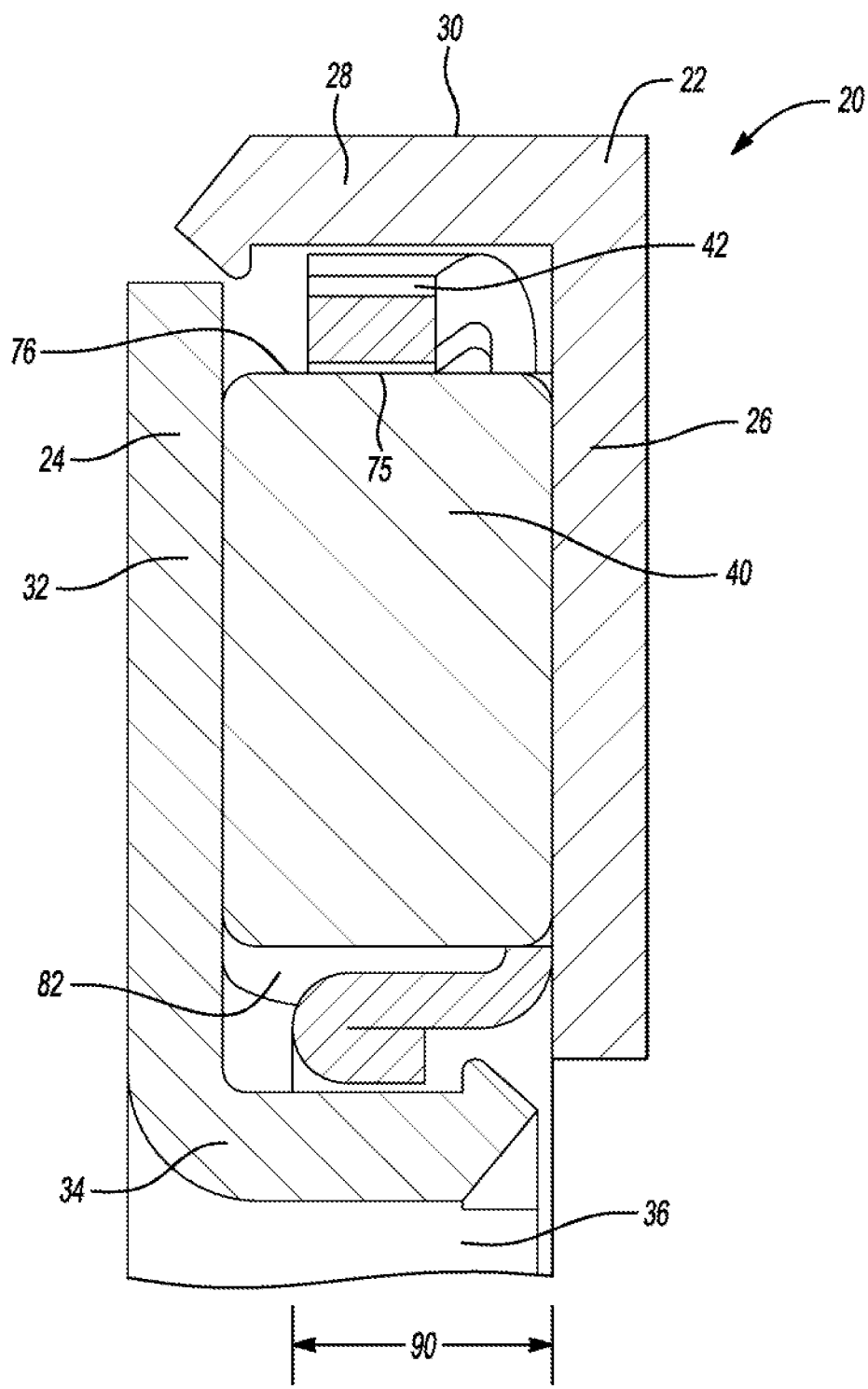
FIG. 1 is a cross-sectional view of a roller bearing.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

FIG. 1 illustrates a roller bearing 20 having a first race 22 and a second race 24. The bearing 20 may be a thrust bearing. The first race 22 includes a radially extending portion 26 and an axially extending portion 28 that defines the outer diameter 30 of the bearing 20. In other embodiments, the first race 22 may be flat race without the portion 28. The second race 24 includes a radially extending portion 32 and an axially extending portion 34 that defines the inner diameter 36 of the bearing 20. In other embodiments, the second race 22 may be flat race without the portion 34. The radially extending portion 26 of the first race 22 is designed to contact a first component, and the radially extending portion 32 of the second race 24 is designed to contact a second component that rotates relative to the first component. The bearing 20 facilitates the relative rotation between the first and second components and supports axial loading between the first and second components. Cylindrical rolling elements 40 are disposed between the races 22 and 24. The rolling elements 40 reduce friction between the races and resist axial movement of the first race 22 towards the second race 24. The rolling elements 40 are supported by a cage 42 that maintains circumferential spacing of the roller elements 40 and radial placement of the rolling elements 40 within the bearing 20.

The roller bearing 20 is designed for high-speed applications and includes features for reducing drilling of the bearing elements 40 into the cage 42. Drilling is when the end of a cylindrical roller elements cuts a bore into the cage, like a drill bit would, due to high revolution speed and centrifugal force of the roller. The cage 42 of the bearing 20 is specifically designed to inhibit drilling. Drilling occurs more commonly on the outer diameter of the cage, due to centrifugal force, but can also occur on the inner diameter of the cage. Drilling can be mitigated by placing the contact points of the cage near the axis of revolution of the rollers. Theoretically, the rotational speed of the rollers at the axis is zero and increases towards the perimeter. Placing the contact points near the axis reduces the speed difference between the cage and the roller elements thus inhibiting drilling. The following figures and related text describe the anti-drilling features of the cage 42.

Figure 2:
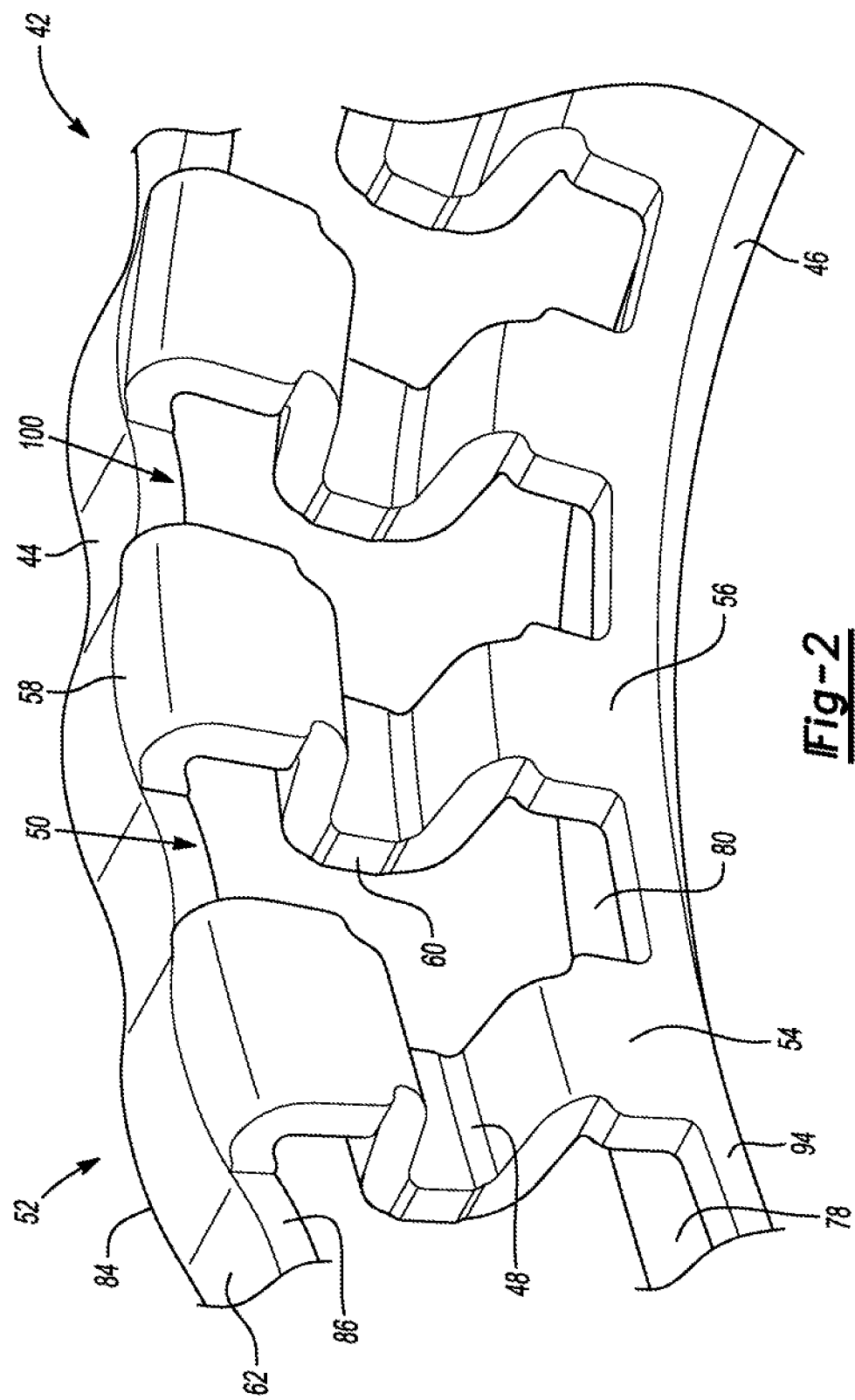
FIG. 2 is a partial perspective view of a cage of the roller bearing.
Figure 3:
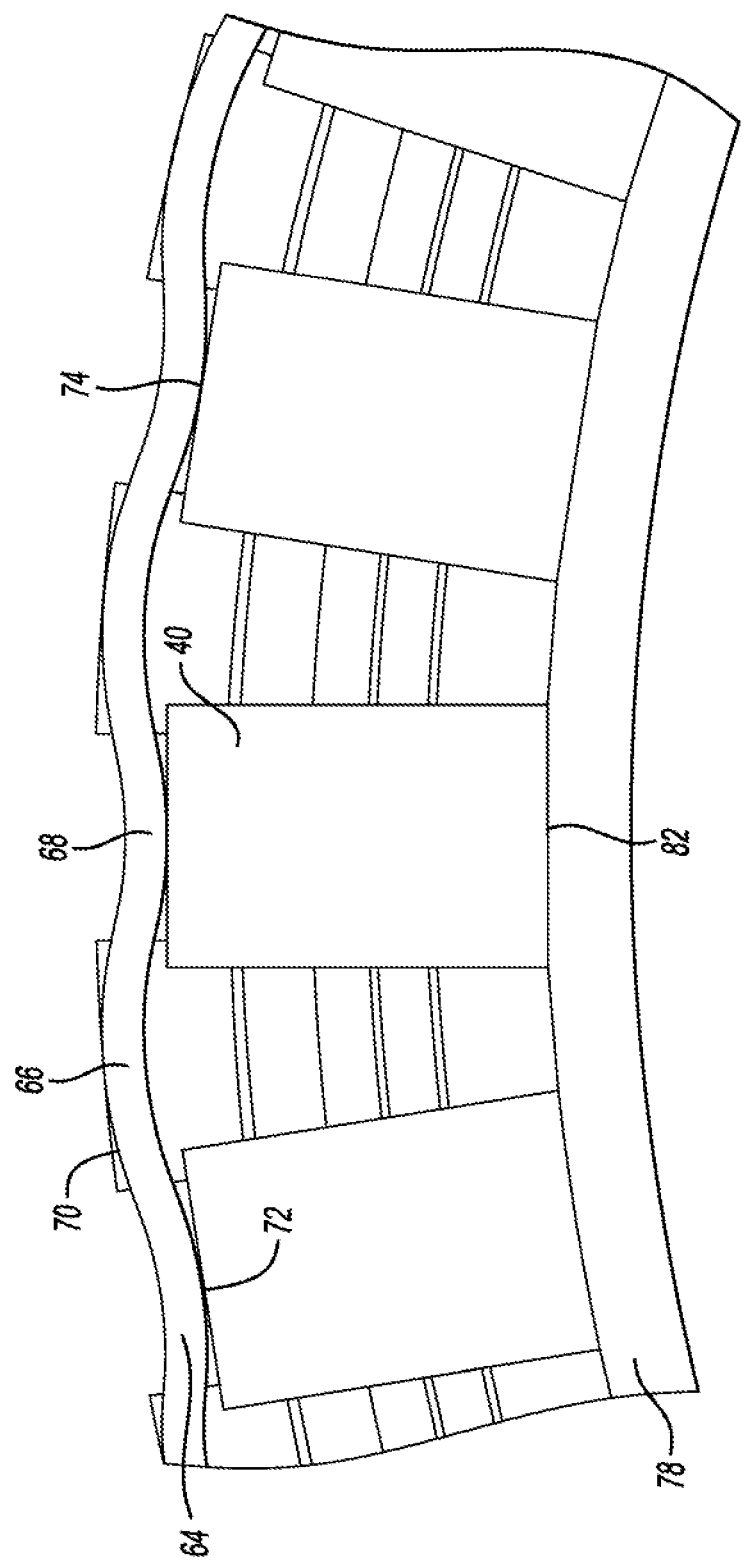
FIG. 3 is a partial front view of the cage with roller elements installed.
Figure 4:
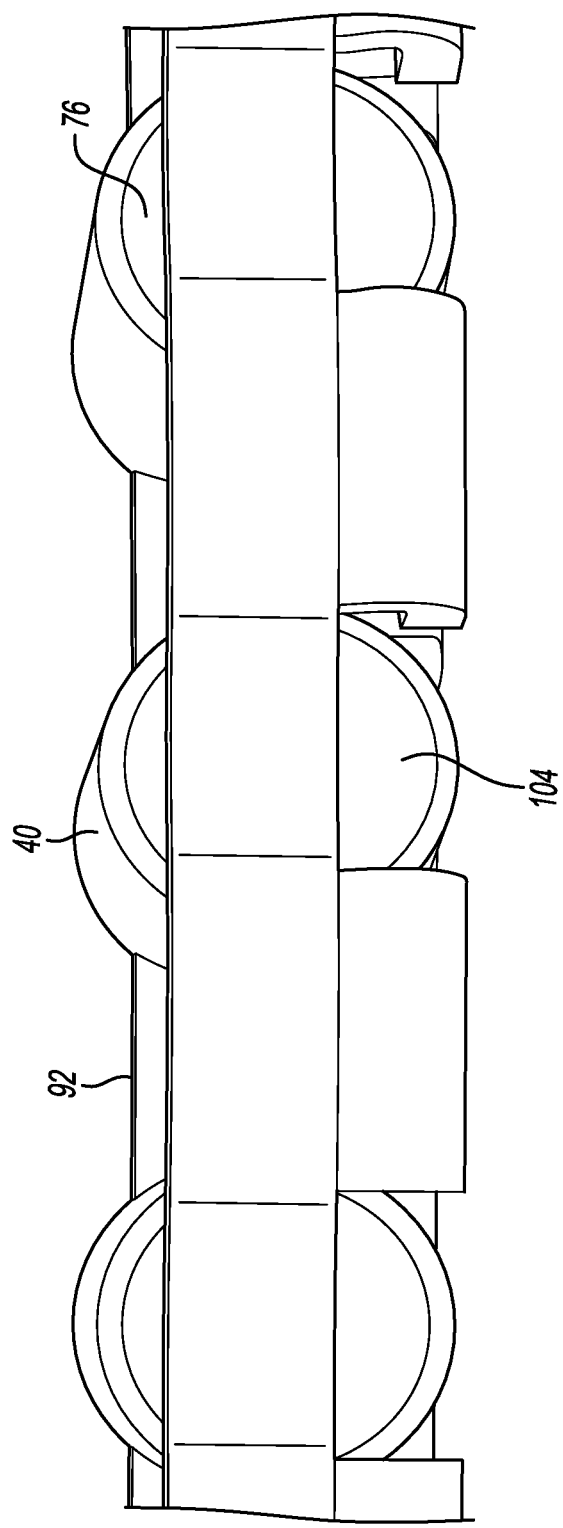
FIG. 4 is a partial top view of the cage with roller elements installed.

Referring to FIGS. 2, 3, and 4, the cage 42 includes an outer rim 44 and inner rim 46 that is circumscribed by the outer rim 44. A plurality of webs 48 connect between the inner and outer rims. The webs 48 are circumferentially spaced around the cage 42 to define pockets 50 configured to receive the roller elements 40. The webs 48 and the pockets 50 may have equal circumferential spacing around the cage 42. The cage 42 includes a front side 52 and a backside 54. Generally, the webs 48 are located on the backside 54 of the cage but do include portions that extend axially forward into an interior portion of the cage. Each web 48 includes a lower portion 56 connected to inner rim 46 and an axially extending flange 58 connected to the outer rim 44. The web 48 may also include a protruding portion 60 that extends axially forward towards the front 52. The protruding portions 60 border the sides of the roller elements 40 and maintain circumferential positioning.

The outer rim 44 includes an outer circumferential surface 62 and an inner circumferential surface 64. The outer rim 44 may be wavy and formed of a plurality of concave and convex arcuate segments 66, 68 that alternate along the circumference. This creates radially outer portions 70 and radially inner portions 72. The radially inner portion 72 form outer guide surfaces 74 of the pockets 50. The outer guide surfaces 74 are configured to engage with outer ends 76 of the rollers 40 to restrict outward radial movement. The outer circumferential surface 78 forms inner guide surfaces 80 configured to engage with inner ends 82 of the rollers to restrict inward radial movement.

The flanges 58 connect to the outer rim 44 at the radially outer portions 70. The outer rim 44 includes a front surface 84, a back surface 86, and an axial width 88 defined between the front and back surfaces. The outer rim 44 is narrower than the inner rim 46, i.e., the axial width 88 is less than the axial width 90 (see FIG. 1) of the inner rim 46. The outer rim 44 is positioned relative to the inner rim 46 so that the front surface 84 of the outer rim generally aligns with the front surface 92 of the inner rim. Thus, the back surface 86 of the outer rim is forward of the back surface 94 of the inner rim. The flanges 58 are provided to connect the more forwardly positioned outer rim 44 to the webs 48. This arrangement creates a plurality of cutouts 100 disposed between the flanges 58 and circumferentially aligned with the pockets 50. The cutouts 100, like the webs 48 and pockets 50, may have equal circumferential spacing.

The cutouts 100 create a discontinuous backside 54 of the cage 42 near the outer diameter and a discontinuous outer diameter, i.e., the cutouts 100 remove material from both the outer diameter and the backside. The placement of the outer rim 44, the convex segments 68, and cutouts 100 cooperate to substantially reduce the likelihood of drilling. While the example cage 42 includes all of these features, and in other embodiments, the cage may only include one or more of these features to mitigate drilling.

The outer rim 44 is positioned relative to the roller elements 40 so that the outer guide surfaces 74 are axially located to contact the ends 76 near the center, which is located on the axis of revolution. By being arcuate, the outer guide surfaces 74 have reduced circumferential contact with the rollers as well to further center the outer guide surfaces 74 on the axis. This reduces the relative speed differences between the roller elements 40 and the cage 42, which reduces the likelihood of drilling. The outer rim 44 and the roller elements 40 may be configured so that the outer guide surfaces 74 engage with a center portion 75 (see FIG. 1) of the end 76. The center portion 75 may refer to the radially inner 70%, 60%, 50%, 40%, 30%, or 20%. (For clarity, 0% is at the center and 100% is at the perimeter.) The cutouts 100 ensure that a perimeter portion 104 the rollers 40 cannot contact the back portion of the cage 42, an area that is prone to drilling. Perimeter portion of the roller element may refer to the radially outer 10%, 20%, 30%, 40% or 50% of the roller. (For clarity, 0% is at the perimeter and 100% is at the center.) The cutouts 100 may also ease forming of the cage 42 during manufacturing and reduce mass of the cage 42.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST bearing 20
first race 22
second race 24
portion 26 portion 28
outer diameter 30
portion 32
portion 34
inner diameter 36
rolling elements 40
cage 42
outer rim 44
inner rim 46
webs 48
pockets 50
front 52
back 54
portion 56
flanges 58
portions 60
outer circumferential surface 62
inner circumferential surface 64
concave arcuate segments 66
convex arcuate segments 68
outer portions 70
inner portions 72
outer guide surfaces 74
center portions 75
outer ends 76
outer circumferential surface 78
inner guide surfaces 80
inner ends 82
front surface 84
back surface 86
axial width 88
axial width 90
front surface 92
back surface 94
cutouts 100
perimeter portion 104

What is claimed is:

1. A roller bearing comprising:
a first race;
a second race;
a cage disposed between the first and second races, the cage including:
an inner rim,
a plurality of webs extending radially outboard from the inner rim and being circumferentially arranged around the inner rim to be spaced apart to define pockets, the webs having flanges that extend axially, wherein portions of the inner rim disposed between the webs form inner guide surfaces of the pockets,
a wavy outer rim circumscribing the inner rim, the outer rim having radially outer portions attached to the flanges and radially inner portions forming outer guide surfaces of the pockets, and
a plurality of cutouts, each extending radially through a thickness of the outer rim, defined between an adjacent pair of the flanges, and forming a radial back surface of the outer rim that extends circumferentially between the adjacent flanges, wherein the radial back surfaces of the outer rim are axially forward of a back surface of the inner rim to form a discontinuous backside of the cage; and
cylindrical roller elements disposed in the pockets between the first and second races and having first ends adjacent the inner guide surfaces and second ends adjacent the outer guide surfaces.

2. The roller bearing of claim 1, wherein the radially inner portions and the radially outer portions are arcuate.

3. The roller bearing of claim 2, wherein the inner portions and the outer portions have opposite concavities.

4. The roller bearing of claim 3, wherein the inner portions and the outer portions have same radii.

5. The roller bearing of claim 1, wherein the cylindrical roller elements have axes of revolution, and the outer guide surfaces are aligned with the axes of revolution.

6. The roller bearing of claim 1, wherein each of the webs includes protruding portions that extend axially.

7. The roller bearing of claim 1, wherein the first race includes a radial wall configured to engage the roller elements.

8. The roller bearing of claim 7, wherein the second race includes a radial wall configured to engage the roller elements and an inner ring configured to engage the inner rim.

9. The roller bearing of claim 1, wherein the cutouts have equal circumferential spacing relative to each other.

10. A cage for use with a roller bearing, the cage comprising:
an inner rim;
a plurality of webs extending radially outboard from the inner rim and being circumferentially arranged around the inner rim to be spaced apart to define pockets configured to receive roller elements, the webs having flanges that extend axially, wherein portions of the inner rim disposed between the webs forms inner guide surfaces of the pockets;
a wavy outer rim circumscribing the inner rim, the outer rim having radially outer portions attached to the flanges and radially inner portions forming outer guide surfaces of the pockets; and
a plurality of cutouts, each extending radially through a thickness of the outer rim, defined between an adjacent pair of the flanges, and forming a radial back surface of the outer rim that extends circumferentially between the adjacent flanges, wherein the radial back surfaces of the outer rim are axially forward of a back surface of the inner rim to form a discontinuous backside of the cage.

11. The cage of claim 10 further comprising cylindrical roller elements disposed in the pockets with first ends adjacent the inner guide surfaces and second ends adjacent the outer guide surfaces.

12. The cage of claim 10, wherein the cutouts have equal circumferential spacing relative to each other.

13. The cage of claim 10, wherein the radially inner portions and the radially outer portions are arcuate.

14. The cage of claim 13, wherein the inner portions and the outer portions have opposite concavities.

15. The cage of claim 14, wherein the inner portions and the outer portions have same radii.

16. A roller bearing comprising:
a first race;
a second race;
a cage disposed between the first and second races, the cage including:
an inner rim having a back surface,
an outer rim having a back surface and circumscribing the inner rim such that the back surface of the outer rim is forward of the back surface of the inner rim, and
a plurality of radially extending webs circumferentially arranged around the inner rim and spaced apart to define pockets, each of the webs having an axially extending flange connected to the back surface of the outer rim, wherein the outer rim and the flanges cooperate to define a plurality of cutouts circumferentially aligned with the pockets and forming a discontinuous back side of the cage, each of the cutouts being defined between an adjacent pair of the flanges and an associated portion of the back surface of the outer rim; and cylindrical roller elements disposed in the pockets between the first and second races and having first ends adjacent the inner rim and second ends adjacent the outer rim, wherein the roller elements are disposed in the pockets such that the cutouts expose the second ends to prevent contact between a perimeter portion of the roller elements and the outer rim.

17. The roller bearing of claim 16, wherein the outer rim has an axial width that is less than a diameter of the roller elements.

18. The roller bearing of claim 16, wherein the outer rim has radially outer portions attached to the webs and radially inner portions forming outer guide surfaces of the pockets configured to engage with the second ends.

19. The roller bearing of claim 18, wherein the radially inner portions and the radially outer portions are arcuate and have opposite concavities.

20. The roller bearing of claim 16, wherein the outer rim has an axial width that is less than an axial width of the inner rim.

* * * * *